Aug. 3, 1965    G. GRÜNEBERG ETAL    3,198,666
ELECTROCHEMICAL FUEL CELL OPERATION WITH
ANTIPOLAR ION EXCHANGE MEMBRANE
Filed May 3, 1961    4 Sheets-Sheet 1

INVENTORS:
GERHARD GRÜNEBERG
MARGARETE JUNG
BY
Burgess, Dinklage & Sprung
ATTORNEYS

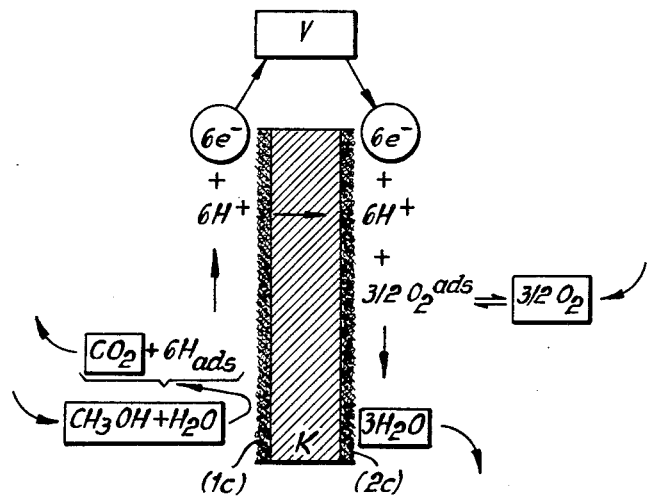
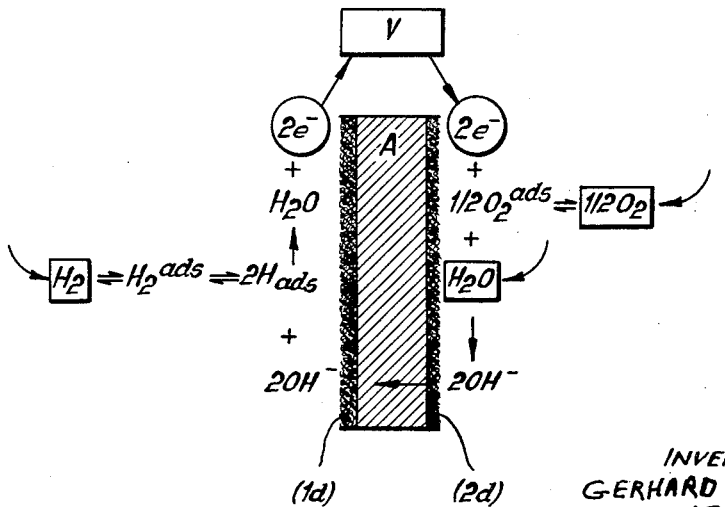

+# United States Patent Office 3,198,666
Patented Aug. 3, 1965

3,198,666
ELECTROCHEMICAL FUEL CELL OPERATION WITH ANTIPOLAR ION EXCHANGE MEMBRANE
Gerhard Grüneberg, Oberhausen-Holten, and Margarete Jung, Frankfurt am Main, Germany, assignors to Varta Aktiengesellschaft, a corporation of Germany, and Siemens-Schuckert-Werke, Aktiengesellschaft, Erlangen, Germany, a corporation of Germany
Filed May 3, 1961, Ser. No. 107,427
Claims priority, application Germany May 7, 1960, R 27,918
12 Claims. (Cl. 136—86)

The present invention relates to a fuel cell for the electrochemical utilization of fluid fuels by converting the chemical energy recoverable from the oxidation of such fuels directly into electrical energy, and more particularly to a process and apparatus wherein electrochemical utilization may be achieved by providing a pair of hydrated ion exchange resin membranes positioned between the fuel electrode and oxygen electrode of the fuel cell.

The use of hydrated ion exchange resin membranes in fuel cells is well known, as exemplified by the fuel cell disclosed in British Patent No. 794,471. However, the fuel cells which have found application up to the present time employ either a cation or an anion exchange resin membrane as solid electrolyte for the cell.

It is an object of the present invention to provide a combined membrane arrangement for a fuel cell wherein the membrane includes both a cation exchange membrane element and an anion exchange membrane element interposed between and in contact with the electrodes of the fuel cell.

Figure 5:
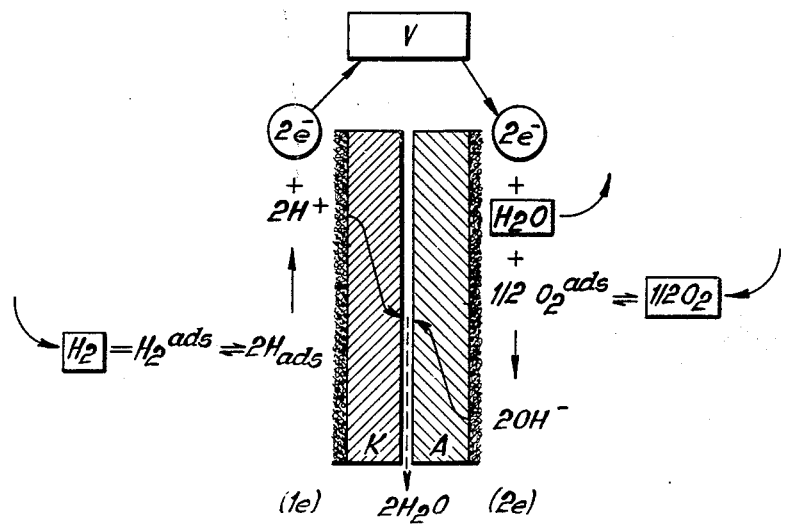
Figure 6:
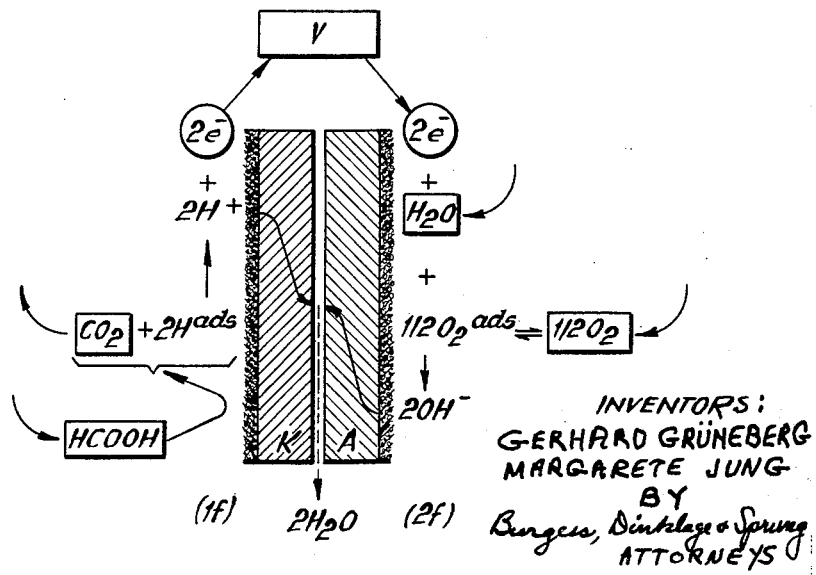
Figure 7:
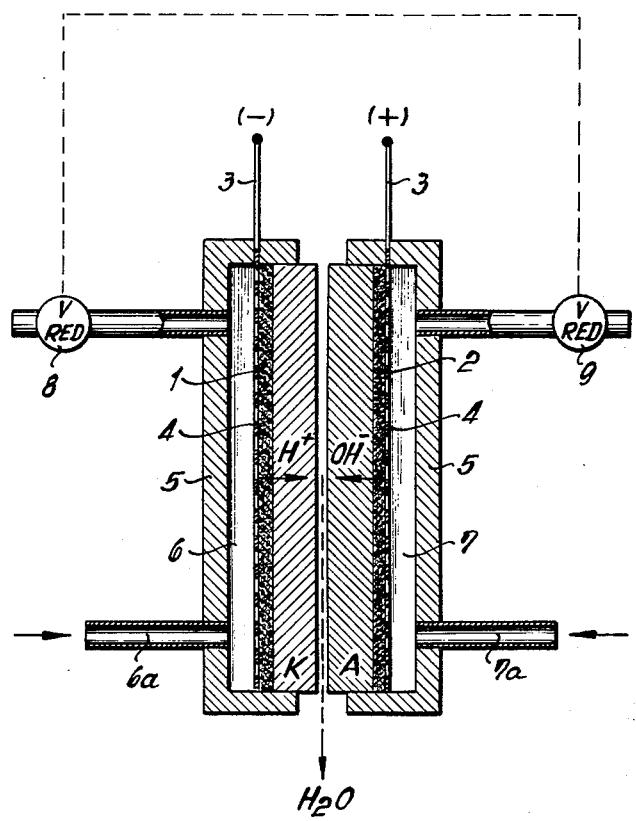

Other and further objects of the invention will become apparent from a study of the within specification and accompanying drawings, in which FIGURES 1–4 schematically illustrate fuel cell arrangements of the conventional type using a common ion exchange resin membrane of either the cationic or anionic type between the fuel electrode and oxygen electrode of the cell;

FIGURES 5 and 6 schematically illustrate fuel cell arrangements in accordance with the invention including both a cation exchange resin element and an anion exchange resin element in combined form between the fuel electrode and oxygen electrode of the cell, and FIGURE 7 is a schematic sectional view of an embodiment of a fuel cell in accordance with the invention showing the spatial relationship and ordinal sequence of the fuel electrode, the cation exchange resin membrane, the anion exchange resin membrane and the oxygen or oxidizing gas electrode.

Figure 1:
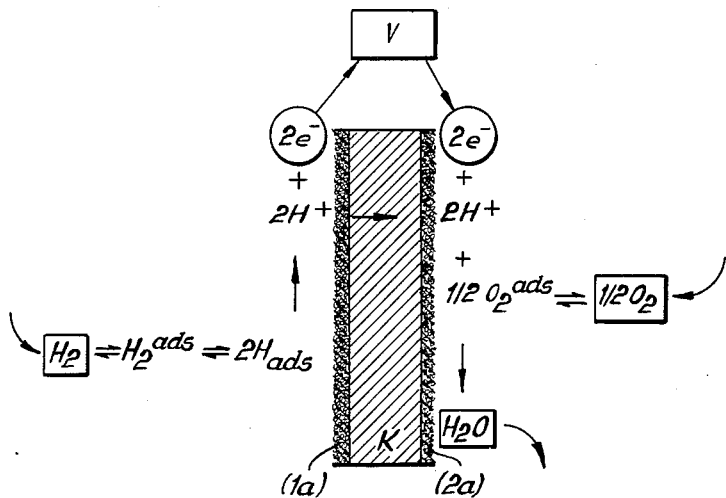
Figure 2:
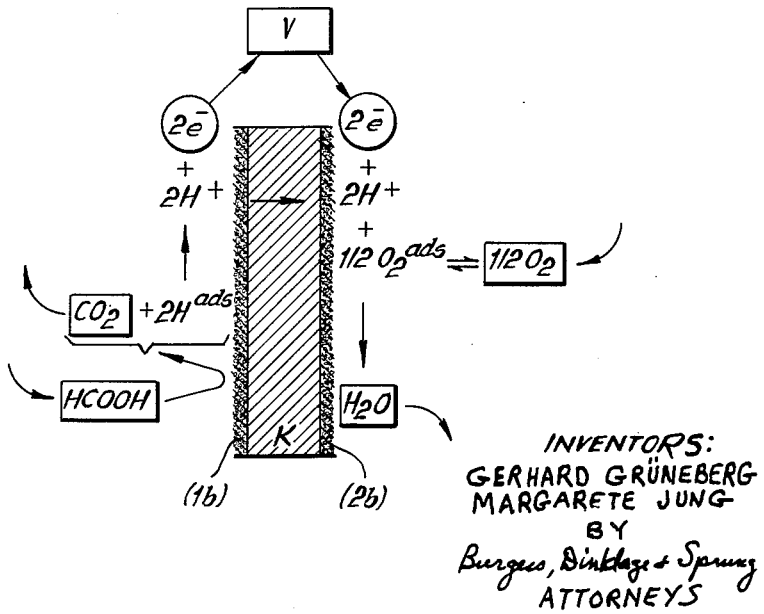

It will be appreciated, on the one hand, that a cation exchange membrane charged or loaded with $H^+$ ions and conducting only $H^+$ ions has an acidic character. Schematically consider and simplified for the purpose of illustration, the conversion of the substances supplied to the electrodes in a fuel cell, having a cation exchange membrane as electrolyte, from which current is drawn by a consuming device, can be represented as follows for the case where hydrogen is used as the fuel:

FUEL ELECTRODE
(1)    $H_2 \rightleftharpoons H_2^{ads} \rightleftharpoons 2H_{ads}$
(2)    $2H_{ads} \rightarrow 2H^+ + 2e^-$ OXYGEN ELECTRODE
(3)    $\tfrac{1}{2} O_2 \rightleftharpoons \tfrac{1}{2} O_2^{ads}$
(4)    $\tfrac{1}{2} O_2^{ads} + 2H^+ + 2e^- \rightarrow H_2O$ This classical process is illustrated by FIG. 1. In this figure and the following FIGURES 2 to 6, respectively, the corresponding reference characters 1a to 1f represent the catalyst of the fuel electrode; 2a to 2f the catalyst of the oxygen electrode; K the cation exchange diaphragm, A the anion exchange diaphragm, and V the device consuming electrical energy. As opposed to the use of hydrogen as fuel, in the case where carbon-containing fuels are used instead, such as formic acid (FIG. 2) or methyl alcohol (FIG. 3), only the reactions preceding the electro-chemical reaction proper, i.e., $H_{ads} \rightarrow H^+ + e^-$ are changed:

(5)    $HCOOH \rightarrow CO_2 + 2H_{ads}$ and (6)    $CH_3OH + H_2O \rightarrow CO_2 + 6H_{ads}$ The advantage of such cell having a cation exchange membrane as electrolyte is to be seen in the fact that, due to the acidic character of the diaphragm or membrane, the carbon dioxide evolved where carbon-containing fuels are used escapes as a gas. However, this type cell arrangement exhibits the disadvantages of poor performance of the attendant oxygen-electrode with such electrolytes of acidic character and undesired accumulation of water on the oxygen electrode.

It will be appreciated, on the other hand, that an anion exchange diaphragm or membrane loaded with $OH^-$ ions and conducting only $OH^-$ ions has an alkaline character. Schematically considered, and simplified for the purpose of illustration, the conversion of material supplied to the electrodes in a fuel cell, having an anion exchange membrane as electrolyte, from which current is drawn by a consuming device, can be represented as follows for the case where hydrogen is used as the fuel:

FUEL ELECTRODE
(1)    $H_2 \rightleftharpoons H_2^{ads} \rightleftharpoons 2H_{ads}$
(2a)   $2H_{ads} + 2OH^- \rightarrow 2H_2O + 2e^-$ OXYGEN ELECTRODE
(3)    $\tfrac{1}{2} O_2 \rightleftharpoons \tfrac{1}{2} O_2^{ads}$
(4a)   $\tfrac{1}{2} O_2^{ads} + H_2O + 2e^- \rightarrow 2OH^-$ This second classical process is illustrated by FIG. 4. The advantage of this cell where hydrogen is used as fuel is to be seen in the fact that the oxygen electrode having an anion exchange membrane as electrolyte can operate in the alkaline medium which is favorable to it. However, the disadvantage of this type cell arrangement resides in the undesired accumulation of water on the fuel electrode. In contrast to the use of hydrogen as fuel, when using carbon-containing fuels instead, the carbon dioxide evolved is neutralized by the $OH^-$ ions of the anion exchange membrane electrolyte to the carbonate, which considerably decreases the electrolytic conductivity of the diaphragm or membrane and generally has the result that the cell soon becomes useless.

It has been found in accordance with the present invention that the foregoing disadvantages may be overcome and an electro-chemical fuel cell may be provided which nevertheless substantially retains the advantages of the cation exchange membrane type fuel cell and the anion exchange membrane type fuel cell.

Accordingly, the present invention contemplates a fuel cell for the electrochemical utilization of hydrogen and/or vaporous or gaseous and/or liquid carbon containing fuels with a diaphragm of hydrated ion exchanging materials as the electrolyte, wherein said ion exchange membrane consists of a combination of two different membranes in tight superimposed position, i. e., both a cation exchange diaphragm, loaded with hydrogen ions and engaging the fuel electrode, and an anion exchange diaphragm, loaded with hydroxyl ions and engaging the oxygen electrode.

It will be appreciated that where the fuel cell of the invention is not in operation, a neutralization reaction:

(7) $$H^+ + OH^- \rightarrow H_2O$$

occurs to a certain extent at the contact surface of the two membranes, i.e., cation exchange diaphragm and anion exchange diaphragm, which imparts "antipolarity" to the membrane combination. When supply fuel to the anode and oxygen to the cathode of the cell, however, and affording opportunity for the electrons to flow under the influence of the resultant potential difference, via an external circuit wire from the negative fuel electrode to the positive oxygen electrode while performing work, the reactions proceeding in the cell for the case where hydrogen is used as fuel are as follows (again largely simplified):

FUEL ELECTRODE (1) $$H^2 \rightleftharpoons H_2^{ads} \rightleftharpoons 2H_{ads}$$

(2) $$2H_{ads} \rightarrow 2H^+ + 2e^-$$

Neutralization reaction between the membranes:

$$2H^+ + 2OH^- \rightarrow 2H_2O$$

OXYGEN ELECTRODE (3) $$\tfrac{1}{2}O_2 \rightleftharpoons \tfrac{1}{2}O_2^{ads}$$

(4a) $$\tfrac{1}{2}O_2^{ads} + H_2O + 2e^- \rightarrow 2OH^-$$

This process is illustrated by Fig. 5 Here again, when using carbon-containing fuels, only the reactions preceding the electro-chemical fuel electrode reaction proper, i.e., $H_{ads} \rightarrow H^+ + e^-$ are changed. In Fig. 6 is represented an example for the electro-chemical conversion of formic acid.

Consequently, the $H^+$ ions produced by the fuel electrode (anode) where electrical energy is supplied and the the $OH^-$ ions produced by the oxygen electrode (cathode) will always combine at the contact surface between the two ion exchange membranes to form water which does not accumulate on one of the two electrodes as in the past but drops out of the system from the contact surface of the membranes. For this reason, the membranes should preferably be arranged vertically. Since the $H^+$ ions in the K membrane (cation) and the $OH^-$ ions in the A membrane (anion) migrate only at a finite velocity, the contact surfaces of fuel-catalyst/K membrane and of oxygen-catalyst/A membrane will naturally have weakly acidic and weakly alkaline character, respectively. The over-all result in accordance with the invention, therefore, will be the desirable evolution of carbon dioxide from the fuel electrode when using carbon-containing fuels, on the one hand, and the satisfactory operation of the oxygen electrode, on the other. Hence, the fuel cell arrangement in accordance with the invention involves a considerable advance in the art over conventional fuel cells equipped with only a single ion exchange membrane, be it a cation exchange membrane or an anion exchange membrane.

Specifically, therefore, a fuel cell for the electro-chemical utilization of fluid fuels is effectively provided in accordance with the invention which comprises means defining a fluid fed fuel electrode and a fluid fed oxygen electrode having a pair of hydrated ion exchange membranes in abutting contact with one another therebetween, including a cation exchange membrane disposed in contact with the fuel electrode and an anion exchange membrane disposed in contact with the oxygen or oxidizing gas electrode, the said membranes serving as electrolyte for the corresponding electrodes.

Suitable ion exchange membranes which may be used in accordance with the invention include all membranes which have sufficiently high $H^+$ and $OH^-$ capacities, respectively, and high $H^+$ and $OH^-$ conductivities as well. The ion exchange resin membranes which may be used as electrolyte in accordance with the invention may be prepared from commercially available ion exchange resin materials (see Blasius, Chromatographische Methoden in der analytischen und präparativen anorganishchen Chemie, F. Enke Verlag, Stuttgart, 1958, page 333, Table 40). The material selected should be such that the electrolyte membrane provided will comply with the following conditions:

(1) Highest possible ion concentration (>0.1 molar)
(2) High electric conductivity or as low as possible an ohmic resistance (<15 ohms/cm$^2$) and
(3) As low as possible a gas permeability.

Especially well suited as cation exchange resins are Permaplex C–10, Amberplex C–1, Nepton CR–51 whereas Permaplex A–10, Amberplex A–1, Nepton AR–111 are preferably used as anion exchange resins.

The catalytically active component of the fuel electrode is preferably platinum and/or palladium, which component may be used in a compact but porous form as well as in a most finely divided form desposited on highly pulverulent or granular carbon. The oxygen electrode, on the other hand, preferably contains silver and/or platinum as the catalytically active constituent, which metals may likewise be used either in compact but porous form or in most finely divided form desposited on highly porous, pulverulent or granular activated charcoal. Suitable activated charcoal which, if desired may be catalytically reinforced with manganese dioxide, such as pyrolusite, and/or cerium dioxide may be used for the electrode on the oxygen side.

In the cases where the electrode materials consist of granular or pulverulent electrically conducting catalyst beds, the same directly contact the corresponding ion exchange membranes on one side and are held together on the side remote from the membrane by an electrically conducting sieve, gauze or a frit. In this connection, the general construction of electrodes for fuel cells containing either a cation or an anion exchange diaphragm as the electrolyte has already been suggested in co-pending U.S. patent application, Serial No. 36,050, filed June 14, 1960.

Thus, in accordance with a preferred embodiment of the invention, the fuel electrode will contain as active catalytic component a member selected from the group consisting of platinum, palladium and mixtures thereof, while the oxygen electrode will contain as active catalytic component a member selected from the group consisting of silver, platinum and mixtures thereof. Moreover, the electrodes will be in compact porous form, and the active catalytic components thereof will be in finely divided condition preferably deposited on granular carbon as carrier. As aforesaid, the oxygen electrode may be provided as activated charcoal catalytically reinforced with a member selected from the group consisting of manganese dioxide, cerium dioxide and mixtures thereof.

One particular embodiment of a fuel cell in accordance with the invention is diagrammatically represented in FIG. 7 where K is the cation exchange diaphragm, A is the anion exchange diaphragm positioned in contact with diaphragm K, 1 is the catalyst bed of the fuel electrode, e.g. granular or pulverulent and catalytically active platinum or palladium, 2 is the catalyst bed of the electrode for the oxidizing gas, e.g. catalytically active silver or platinum, 3, 3 are the leads or terminals for supplying and withdrawing electrons (current), 4, 4 are metallically conducting gauzes or frits maintaining the catalyst beds in proper position, 5, 5 are the casing halves of the fuel cell housing the space 6 for the fuel which enters via the feed line 6a, and the space 7 for the oxidizing gas which enters via the feed line 7a. Pressure reducing valves 8 and 9 are coupled with each other to obtain equalized pressure within the cell system. Thus, $H^+$ and $OH^-$ ions combine at the interface between the abutting surfaces of cation exchange diaphragm K and anion exchange membrane A to form water which passes out of the cell at the interface bottom portion.

It is of particular advantage if the interface between the electrode material and the corresponding ion exchange membrane is as large as possible since more efficient ion exchange is effected thereby. For this purpose, the electrode material and the diaphragm may be extensively admixed into each other. Such admixing and interlocking may be attained, for example, by embedding the electrode material in most finely divided form up to a certain depth into the pore system of the membrane contacting the particular electrode. Normally, the embedding may be effected up to about one-half of the thickness of the membrane, but in any case the embedding is such that the individual particles are in electrical contact with each other.

For the sake of simplicity, in FIGURES 5 to 7 the respective boundary between the cation and the anion exchange membrane is represented by a space. It will be appreciated that the surfaces of the two membranes are not geometrically even, but are in molecular dimensions fissured. If the cation-and the anion exchange membranes are tightly superimposed, the superficial fissures are interlocked whereby numerous points of contact result, owing to which a uniform ion flow occurs in the cell. However, since the capillary structure in the contact zone of the superimposed membranes is not as dense as each membrane, the water of reaction will preferentially flow off from the contact edges of the antipolar membranes, if these are maintained in vertical position.

It will be appreciated that the fuel cell arrangement in accordance with the invention contemplates the provision for a fluid porous fuel electrode layer, a cation exchange resin membrane layer, an anion exchange resin membrane layer and a fluid porous oxygen electrode layer, said layers being in direct contact with one another in the stated ordinal sequence, means for passing a fluid fuel to the fuel electrode layer and oxygen or an oxidizing gas to the oxygen electrode layer, and current terminal means for the fuel electrode layer and the oxygen electrode layer.

All in all, the present invention represents an improvement in the operation of a fuel cell having a fluid fed fuel electrode and a fluid fed oxygen electrode for the electrochemical utilization of fluid fuels in the presence of a membrane of hydrated ion exchange material as solid electrolyte, which comprises operating the fuel cell using a fluid fuel and an oxygen-containing gas with a combined membrane as the membrane of hydrated ion exchange material, the combined membrane having a separate cation exchange zone charged with hydrogen ions (for exmaple, by saturation with a strong inorganic acid, such as HCl) and a separate anion exchange zone charged with hydroxyl ions (for example, by saturation with a strong inorganic base, such as KOH), the cation and anion zones being maintained in mutual contact for ion exchange therebetween while the cation zone is also in contact with the fuel electrode for ion exchange therewith and the anion zone is in contact with the oxygen electrode for ion exchange therewith. In this manner the fuel will be electrochemically dissolved at the fuel electrode and the oxygen will be electrochemically dissolved at the oxygen electrode so that the so-dissolved constituents will electrochemically combust to form water at the combined membrane electrolyte with the generation of electric current.

The manner of operating a fuel cell in accordance with the invention using the combined membrane arrangement is described in the following example, said example being set forth by way of illustration and not limitation.

*Example*

A cation exchange membrane permaplex C–10 and an anion exchange membrane Permaplex A–10, each having a surface area of 250 x 250 mm.$^2$ and a thickness of 0.5 mm., were charged with hydrogen ions and hydroxyl ions respectively, by soaking the cation exchange membrane with 2 N $H_2SO_4$ and the anion exchange membrane with 2 N KOH followed by treating the thus impregnated membranes with water. The humid membranes were tightly superposed and arranged as electrolyte between a fuel electrode and an electrode for the oxidizing gas in abutting contact with the said electrodes. The fuel electrode consisted of a layer of platinized activated-carbon powder containing 10% by weight platinum, the oxygen electrode consisted of a layer of silvered activated-carbon powder, containing 20% by weight silver, each of the electronically conducting layers having a thickness of 1 mm. At the fuel side the pulverulent material of the fuel electrode was limited by a galvanically strutted nickel gauze, the width of the sieve openings of the latter amounting to $20\mu$ whereas the pulverulent material of the oxygen electrode was limited at the oxygen side by a galvanically strutted silver gauze, the width of the sieve openings of the same amounting to $20\mu$. The metal gauzes limiting the pulverulent electrode materials were additionally strutted by coarse screens of high molecular polyethylene, provided in the gas spaces adjacent the metal gauzes. The thickness of a single cell consisting of the said electrodes and the membrane composition arranged therebetween was about 5 mm. Several of those cells were connected in series. During stationary operation of a battery consisting of several cells according to the invention with hydrogen as fuel and oxygen as the oxidizing gas, the two gases being supplied to the respective electrodes with a pressure of 0.01 atm. gauge, a temperature of about 40° C. was adjusted to an output of the single cell of 0.7 [volt], 0.02 [a./cm.$^2$], .625 cm.$^2$=8.75 [watt].

What is claimed is:

1. Fuel cell for the electrochemical utilization of fluid fuels which comprises means defining a fluid fed fuel electrode and a fluid fed oxygen electrode having a pair of hydrated ion exchange membranes in abutting contact with one another therebetween, said pair of membranes including a hydrogen transferring cation exchange membrane disposed in abutting contact with said fuel electrode and a hydroxyl transferring anion exchange membrane disposed in abutting contact with said oxygen electrode, said membranes serving as electrolyte for the electrodes.

2. Fuel cell according to claim 1 wherein the fuel electrode contains as active catalytic component a member selected from the group consisting of platinum, palladium and mixtures thereof and the oxygen electrode contains as active catalytic component a member selected from the group consisting of silver, platinum and mixtures thereof.

3. Fuel cell according to claim 2 wherein said electrodes are in compact porous form.

4. Fuel cell according to claim 2 wherein said electrodes contain the active catalytic components thereof in finely divided form deposited on granular carbon as carrier.

5. Fuel cell according to claim 4 wherein the oxygen electrode includes activated charcoal as carrier catalytically reinforced with a member selected from the group consisting of maganese dioxide, cerium dioxide and mixtures thereof.

6. Fuel cell according to claim 2 wherein each of said electrodes contains the active catalytic component thereof in finely divided form, a portion of said catalytic component being embedded substantially into the corresponding surface of the ion exchange membrane in contact therewith, the individual particles of said catalytic component being in electrically conductive contact with one another.

7. Fuel cell according to claim 1 wherein said cation exchange membrane is charged with hydrogen ions and said anion exchange membrane is charged with hydroxyl ions.

8. Fuel cell for the electrochemical utilization of fluid fuels in the presence of a solid electrolyte which comprises a fluid fed electrode, a fluid fed oxygen electrode, and a combined membrane of hydrated ion exchange material serving as electrolyte disposed therebetween, said combined membrane including a pair of tightly superimposed separate membrane elements in abutting contact with one another along a corresponding side of each, one of said elements being a cation exchange membrane element charged with hydrogen ions and the other being an anion exchange membrane element charged with hydroxyl ions, said cation element being disposed in abutting contact with said fuel electrode and said anion element being disposed in abutting contact with said oxygen electrode.

9. Fuel cell according to claim 8 wherein the fuel electrode contains as active catalytic component a member selected from the group consisting of platinum, palladium and mixtures thereof, the oxygen electrode contains as active catalytic component a member selected from the group consisting of silver, platinum and mixtures thereof, said electrodes are in compact porous form, and each electrode contains the active catalytic component thereof in finely divided form, a portion of said catalytic component being embedded substantially into the corresponding surface of the ion exchange membrane in contact therewith, the individual particles of said catalytic component being in electrically conductive contact with one another.

10. In a fuel cell having a fuel electrode and an oxygen electrode for the electrochemical utilization of fluid fuels in the presence of a membrane of hydrated ion exchange material as solid electrolyte, the improvement which comprises providing a combined membrane as the membrane of hydrated ion exchange material, said combined membrane including a separate cation exchange membrane element charged with hydrogen ions and a separate anion exchange membrane element charged with hydroxyl ions, said elements being superposed in abutting contact with each other along a corresponding side of each, the opposite side of said cation exchange membrane element being in abutting contact with the fuel electrode of the cell and the opposite side of said anion exchange membrane element being in abutting contact with the oxygen electrode of the cell.

11. Fuel cell arrangement comprising a fluid porous fuel electrode layer, a cation exchange resin membrane layer, and anion exchange resin membrane layer and a fluid porous oxygen electrode layer, said layers being in direct abutting contact with one another in the foregoing ordinal sequence, means for passing a fluid fuel to the fuel electrode layer and oxygen to the oxygen electrode layer, and current terminal means for said fuel electrode layer and said oxygen electrode layer.

12. In the method of operating a fuel cell having a fluid fed fuel electrode and a fluid fed oxygen electrode for the electrochemical utilization of fluid fuels in the presence of a membrane of hydrated ion exchange material as solid electrolyte, the improvement which comprises operating the fuel cell using a fluid fuel and an oxygen-containing gas with a combined membrane as the membrane of hydrated ion exchange material, said combined membrane having a separate cation exchange zone charged with hydrogen ions and a separate anion exchange zone charged with hydroxyl ions, said cation zone and anion zone being maintained in mutual contact for ion exchange therebetween while said cation zone is in abutting contact with the fuel electrode for ion exchange therewith and said anion zone is in abutting contact with the oxygen electrode for ion exchange therewith, whereby the fuel electrochemically dissolved at the fuel electrode and the oxygen electrochemically dissolved at the oxygen electrode will electrochemically combust at the combined membrane electrolyte with the generation of electric current.

References Cited by the Examiner

UNITED STATES PATENTS

| 2,829,095 | 4/58 | Kenichi | 204—296 |
| 2,861,116 | 11/58 | Grubb | 204—296 |
| 2,913,511 | 11/59 | Grubb | 136—86 |

FOREIGN PATENTS 844,584  8/60  Great Britain.

JOHN H. MACK, *Primary Examiner.*

JOHN R. SPECK, *Examiner.*

UNITED STATES PATENT OFFICE
CERTIFICATE OF CORRECTION

Patent No. 3,198,666

August 3, 1965

Gerhard Grüneberg et al.

It is hereby certified that error appears in the above numbered patent requiring correction and that the said Letters Patent should read as corrected below.

Column 1, line 57, for "consider" read -- considered --; line 65, formula "(2)" should appear as shown below instead of as in the patent:

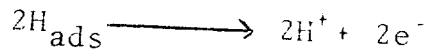

$$2H_{ads} \longrightarrow 2H^+ + 2e^-$$

column 5, line 63, for "exmaple" read -- example --; column 6, line 68, for "devided" read -- divided --; line 74, for "maganese" read -- manganese --; column 7, line 18, for 'superimposed" read -- superposed --.

Signed and sealed this 5th day of April 1966.

EAL)
test:

NEST W. SWIDER
testing Officer

EDWARD J. BRENNER
Commissioner of Patents